Feb. 16, 1937.  H. T. WOOLSON  2,071,292
MOTOR VEHICLE POWER TRANSMISSION
Filed April 18, 1934  2 Sheets-Sheet 2
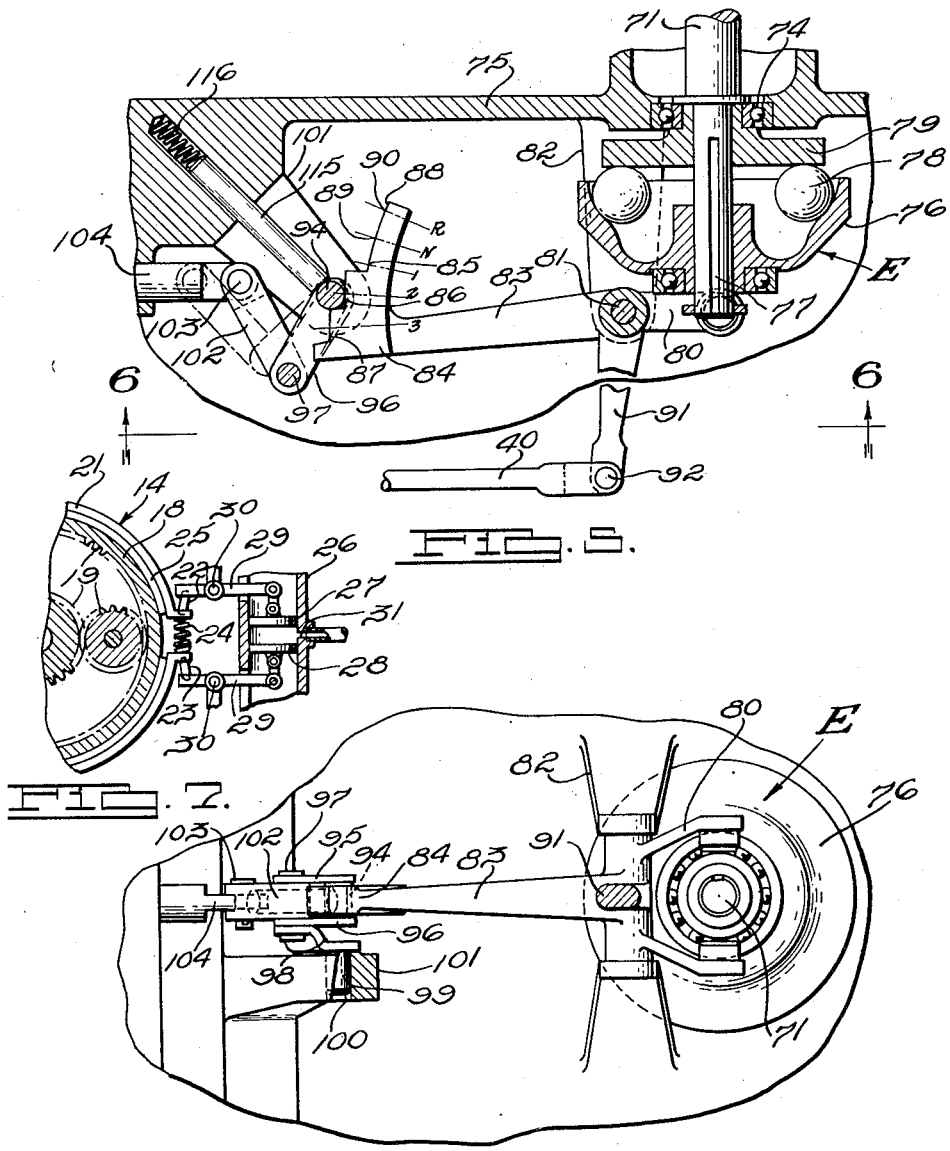
INVENTOR.
Harry T. Woolson
BY
Harness, Lind, Patee & Harris
ATTORNEYS Patented Feb. 16, 1937

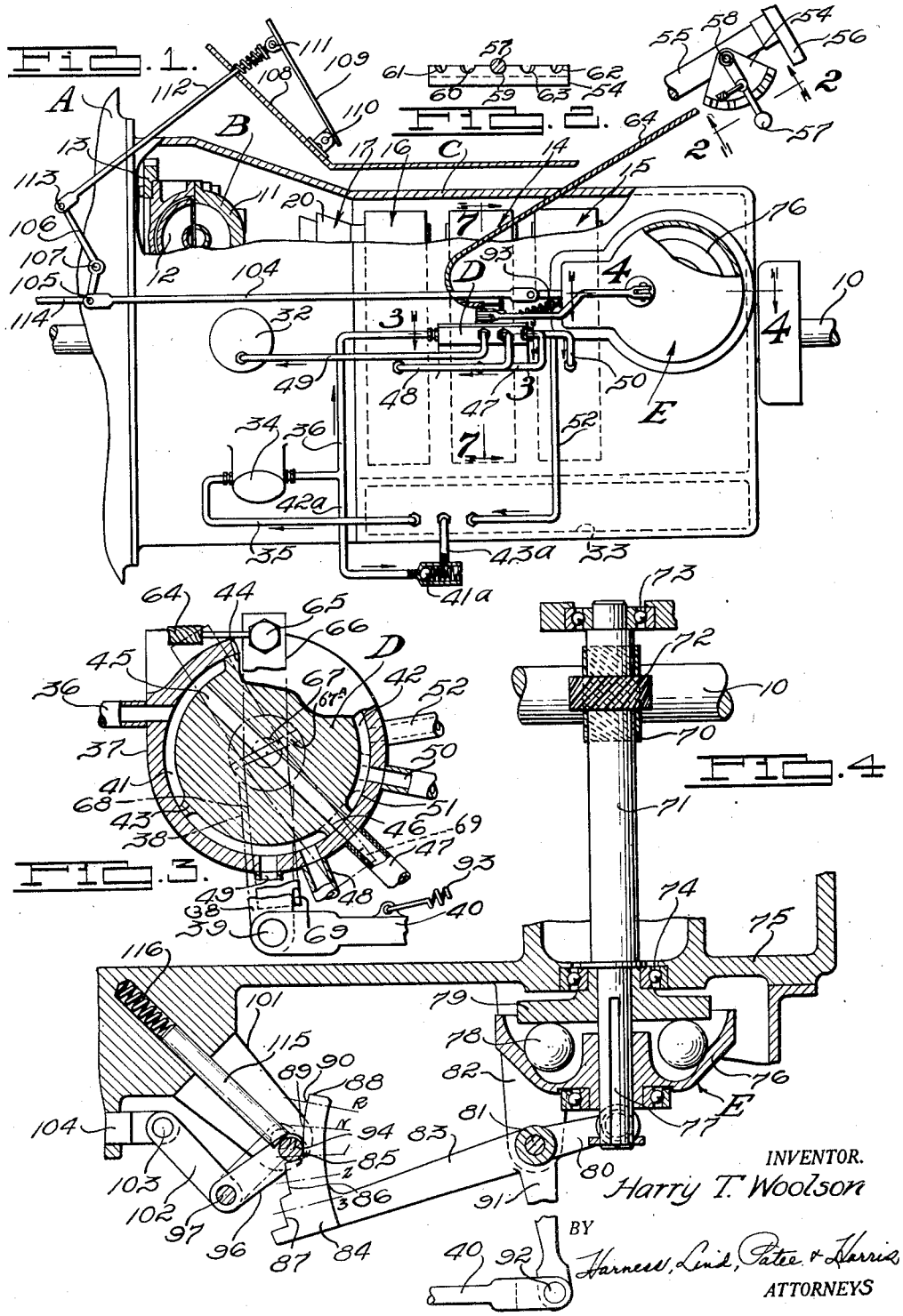

2,071,292

UNITED STATES PATENT OFFICE 2,071,292

MOTOR VEHICLE POWER TRANSMISSION

Harry T. Woolson, Detroit, Mich., assignor to Chrysler Corporation, Detroit, Mich., a corporation of Delaware Application April 18, 1934, Serial No. 721,106

27 Claims. (Cl. 74—262)

This invention relates to motor vehicles and refers more particularly to improvements in means for transmitting power to drive such vehicles.

More particularly, I have provided improvements especially adapted for varying the driving speed ratios of motor vehicles.

It is an object of my invention to provide improvements in motor vehicle transmissions and controls therefor; to provide improved means for operating the various gear trains of a transmission; and to provide relatively simple means for controlling and actuating the various gear ratios of a transmission, capable of manufacture at relatively low cost. While my invention, in the broader aspects thereof, is applicable to various type of transmissions including well-known types of countershaft gear selector transmissions, my invention is particularly related to motor vehicles having speed ratio changing transmissions of the planetary or epicyclic gear type.

A further object of my invention is to provide improved transmission controlling means, especially adapted for use with planetary transmissions, my transmission control operating to establish the various gear ratios with improved positiveness, simplicity, and efficiency.

A further object of my invention, in its more limited aspects, resides in the provision of fluid operating means of improved form and arrangement for controlling the planetary gear sets of a transmission, or other corresponding parts of other types of transmissions. In the broader aspects of my invention, the fluid pressure is preferably provided by a suitable liquid medium such as oil, but the fluid pressure medium may be air under pressure greater or less than atmospheric pressure.

A further object of my invention resides in the provision of improved means for controlling the speed ratios of a transmission, preferably of the planetary gear type, wherein changes in the speed ratios are automatically produced in response to conditions of drive through the transmission. More particularly, I have provided transmission controlling means which is automatically responsive to speeds of the motor vehicle, preferably in combination with means under control of the vehicle driver for manually controlling the action of the automatic gear ratio selecting means.

In carrying out the objects of my invention, I have provided a transmission speed ratio controlling means of the character referred to wherein, under certain desirable conditions of motor vehicle operation, the various transmission gear ratios may be effected in response to manual selection by the vehicle driver, the transmission being manipulated under power in response to the manual selection.

I have further provided means, such as a governor, responsive to speeds of the vehicle for automatically manipulating the transmission under power independently of the manual selection but preferably under control thereof. The control mechanism is preferably arranged so that with the vehicle standing still and the transmission in its neutral or non-driving condition, the drive to the vehicle through the transmission is initially effected in response to actuation of the manually controlled selector means into a forward gear ratio speed setting or into reverse.

In one embodiment of my invention I have provided for manual selection of the transmission speed ratios at any time to a transmission setting for driving the vehicle faster than the transmission speed ratio setting tending to be produced under the influence of the governor, this manual selection to a speed higher than the governor setting being independent of the governor action at least insofar as transmission speed ratio changes are concerned. The transmission speed ratio produced or tending to be produced by the governor speed preferably limits operation of the manual selector so that the manual selector cannot be operated to produce transmission driving speeds below the governor speed. Furthermore, a setting of the manual selector into a certain speed leaves the governor free to manipulate the transmission into higher driving speeds but limits the action of the governor so as to prevent the governor from manipulating the transmission into lesser speeds.

A still further object of my invention resides in the provision of improved means for controlling transmission gear ratio changes in response to a governor or other vehicle speed actuated device. This control is preferably produced by actuation of the engine throttle valve adjusting means such as the usual accelerator pedal so that the action of the governor in manipulating the transmission from a driving speed into a higher driving speed will be delayed preferably in proportion to the engine throttle valve opening or the extent of accelerator pedal depression. I have furthermore provided an improved accelerator pedal control for a governor device of the character referred to wherein the load of the governor is not transmitted to the accelerator pedal, such arrangement being very desirable in relieving the vehicle driver of the effort of overcoming the relatively high pressure or force produced by the governor.

A planetary type of transmission presents a number of advantages over the more conventional sliding gear types of transmissions, and my invention is therefore primarily directed toward planetary types of transmissions and power transmission systems employing planetary gearing speed ratio controlling devices, although, as aforesaid, the fundamental principles of my invention may, if desired, be employed in connection with transmissions of other types including the aforesaid sliding gear types of transmissions.

By way of example in connection with the aforesaid advantages of the planetary transmission over more conventional types, it may be noted that the planetary transmission permits gear changes without the necessity of releasing the main clutch between the engine and transmission so as to obtain relatively quick gear changes and faster acceleration of the motor vehicle. This is made possible by reason of the fact that the braking devices associated with the respective planetary gear trains are, in effect, clutches in that each rotary drum controlling a planetary gear train is frictionally engaged by its associated braking means.

Further objects and advantages of my invention will be apparent from the following detailed description of one illustrative embodiment of the principles of my invention, reference being had to the accompanying drawings, in which;

Fig. 1 is a side elevational view somewhat diagrammatically illustrating my power transmission mechanism as a whole, parts of the transmission and clutch casings being broken away to illustrate the speed ratio controlling brake devices and the main clutch.

Fig. 2 is a detail side elevational view of the selector segment associated with the manual selecting device, the view being taken along the line 2—2 of Fig. 1.

Fig. 3 is a sectional plan view through the selective speed ratio controlling means or distributor valve, the section being taken along the line 3—3 of Fig. 1.

Fig. 4 is a sectional plan view of the governor controlling mechanism and accelerator pedal controlling means in association therewith, the section being taken along the line 4—4 of Fig. 1.

Fig. 5 is a view corresponding to Fig. 4 but illustrating the parts in another of their positions of control.

Fig. 6 is a side elevational view of the mechanism illustrated in Fig. 5 partly in cross section, the view being taken along the line 6—6 of Fig. 5.

Fig. 7 is a sectional elevational view somewhat diagrammatic and illustrating one of the planetary transmission speed ratio brake controlling devices, the section being taken along the line 7—7 of Fig. 1.

Referring to the drawings, I have illustrated my invention in connection with a motor vehicle drive, this drive including a prime mover or engine A, a portion of which is shown in Fig. 1, a clutch B driven from the engine, and a change speed transmission or gear box C driven from the clutch B. The drive passes from the transmission through a power take-off shaft 10 which, as usual, may extend rearwardly of the vehicle to drive the usual rear ground wheels (not shown).

The clutch B may be of any suitable construction for controlling the drive between engine A and transmission C, this clutch being illustrated in Fig. 1 in the form of a fluid type having the usual driving and driven cooperating vane members 11 and 12 respectively. The driving vane member 11 is carried by the engine flywheel 13 and the driven vane member 12 is secured to the usual power shaft which extends rearwardly to transmission C, this power shaft not being illustrated. I have illustrated a fluid type of clutch since a clutch of this character has a number of advantages in connection with the transmission of the planetary gear type C. Thus, the fluid type of clutch is desirable in providing a smooth drive for the vehicle through the planetary transmission, relatively high power driving efficiency, and other well-known favorable characteristics.

I have illustrated the change speed transmission C as the epicyclic or planetary type, this general form of transmission being well known in the art and, as usual, includes a plurality of transmission speed ratio controlling brakes 14, 15 and 16, these braking devices being respectively adapted to actuate the transmission in its first speed ratio or low gear, second speed ratio, and reverse drive. A further controlling device 17 is illustrated as a clutch of the cone type, adapted to control the transmission for effecting the third speed herein illustrated as the usual direct drive through the transmission.

The brake controlling devices 14, 15 and 16 are adapted to act on transmission elements associated therewith and usually embodied in the form of a rotary drum, one of which is illustrated at 18 in Fig. 7 in association with the transmission controlling brake 14 for the first speed. The form and arrangement of these planetary gear trains are well known in the art and the details thereof are omitted from my disclosure. The controlling device 17 is adapted according to customary practice to engage a drum 20 illustrated in Fig. 1 for effecting the direct drive in a well-known manner.

The brake controlling devices 14, 15 and 16 are, for the most part, similar in construction and operation and the following description of the details of the brake device 14 illustrated in Fig. 7 is typical of the other brakes. In Fig. 7 the drum 18 is normally rotated by the planetary gearing 19 associated therewith when the transmission is not in its first speed driving condition, and when rotation of drum 18 is prevented by the braking mechanism associated therewith, then the drive through the transmission takes place for the first speed gear ratio according to well-known practice for planetary gearings of the general type illustrated.

In order to brake the drum 18 I have provided a band 21 around the drum to provide ends 22 and 23 normally separated by a spring 24, the band 21 being provided with a brake lining 25 adapted to contact with the drum when the ends 22 and 23 of the brake band are forced toward each other to contract the band. The band is anchored in any suitable manner not illustrated and suitable brake actuating mechanism is provided for each of the bands such as the actuating mechanism illustrated in Fig. 7, for example.

Associated with each of the brake controlling devices 14, 15 and 16 is a cylinder, one of these cylinders being illustrated at 26 in Fig. 7 in association with the brake device 14. This cylinder receives a pair of opposed pistons 27 and 28, the pistons being operably connected to actuate the respective band ends 22 and 23 by suitable links 29 pivotally supported at 30. The cylinder 26 has a fluid pressure inlet 31 adapted to admit fluid such as oil under pressure to the space between pistons 27 and 28 so as to actuate these pistons away from each other in contracting the brake band to arrest rotation of the associated controlling drum 18 as shown in Fig. 7. When the fluid pressure is released, the spring 24 will act to space the brake band 21 from drum 18, pistons 27 and 28 being also restored and the fluid pressure being displaced from the cylinder 26 by way of the opening 31.

The direct speed controlling device 17 is also suitably actuated by fluid pressure introduced to a cylinder illustrated at 32 in Fig. 1, it being understood that this cylinder is adapted to receive one or more pistons actuated by fluid pressure introduced to the cylinder to cause engagement of the cone type drum 20 to effect the third speed or direct drive through the transmission C.

In order to selectively control the supply of fluid under pressure to the actuating mechanism for each of the various speed ratio controlling brakes, I have provided a fluid pressure control and distributing system illustrated in somewhat diagrammatic form in Figs. 1 and 3. The transmission reservoir 33 contains a quantity of fluid such as oil, a pump indicated at 34 being suitably driven so as to draw the oil from the reservoir by a pipe or conduit 35, the oil under pressure being discharged from the pump through a high pressure conduit 36 leading to the valve casing 37 of the selective controlling means or speed ratio selector herein illustrated in the form of rotary distributing valve means D best shown in Fig. 3. The valve D is adapted for oscillatory adjustment and control by a lever 38 pivotally connected at 39 with an actuating link 40 which, as will be presently apparent, extends to the vehicle speed responsive actuating means or governor E best shown in Fig. 4. A relief valve 41ᵃ may be interposed by pipes 42ᵃ and 43ᵃ between the pressure conduit 36 and reservoir 33 so as to by-pass any excess delivery of pump 34 back to the reservoir.

The valve D cooperates with casing 37 to provide a fluid pressure supply space or chamber 41 and a low pressure space or chamber 42, these chambers being separated from each other by the radially extending valve portions 43 and 44 engaging casing 37. The supply chamber 41 delivers oil under pressure from supply conduit 36 through a passage 45 extending through the valve to a distributing outlet 46 illustrated in Fig. 3 as registering with a conduit 47, the outlet 46 being also adapted for selective alignment with further conduits 48, 49 and 50. The casing 37 has an uninterrupted portion 51 intermediate the conduits 47 and 50 so that when the outlet 46 is adjusted opposite the portion 51, the oil in passage 45 will not escape, this position being the neutral setting of valve D.

The low pressure chamber 42 is continuously open to a conduit 52 which is arranged below the plane of oscillatory movement of outlet 46, the conduit 52 communicating with the reservoir 33 as illustrated in Fig. 1. During movement of valve D, the high pressure chamber 41 is continuously in communication with the oil pressure delivery conduit 36, and the low pressure chamber 42 is continuously in communication with the return conduit 52.

The distributor valve D is adapted to be manually adjusted under certain conditions and the governer action controlled in a novel manner by the vehicle driver and in Figs. 1 and 2 I have illustrated this adjusting or selecting means as comprising a stationary selector segment 54 conveniently mounted to the steering post 55 of the vehicle steering wheel 56, the segment 54 having a plurality of notches, releasable stops or other suitable means for advising the operator of the setting of a hand operated selector lever or element 57 pivotally mounted at 58 in association with the segment 54. These notches further serve to hold the selector lever 57 in any of its positions of manually selective adjustment against displacement under the influence of the speed responsive means acting on the distributor valve D as will be presently apparent. The selector lever 57 has a certain amount of resilience so that when moved by the vehicle driver the lever may be sprung for selective engagement with the various notches of segment 54. Thus, the segment 54 has the notches or stops 59, 60, 61, 62 and 63 respectively adapted, when engaged with selector arm 57, to manipulate transmission C (within certain limitations and conditions which will hereinafter be more apparent) into the first speed gear ratio drive, the second speed, the third or direct speed, reverse drive, and neutral, the latter setting establishing a neutral condition in the transmission whereby there will be no drive therethrough to the take-off shaft 10. The valve D is adapted for actuation by selector arm 57 in a positive manner in one direction of oscillatory movement of valve D by reason of a suitable linkage such as a Bowden wire mechanism 64 which, as illustrated in Fig. 1 is connected at one end to the selector arm 57. The other end of the Bowden wire 64 is connected at 65 to lever 66, this lever being loosely mounted on a pin or shaft 67. The shaft 67 is integral with or securely fixed to the valve D at the axis of oscillation of the valve, the pin 67 being journaled by the upper and lower walls of casing 37 so as to guide the valve during oscillatory movements thereof. The lever 66 has an integral arm or lever extension 68, the lever 68 extending generally radially diametrically opposite the lever 66 which is a part thereof, the lever 68 having an actuating flange 69 deflected therefrom into engagement with lever 38 as shown in Fig. 3. The flange 69, therefore, forms an adjustable stop under control of selector arm 57 preventing counterclockwise rotation of valve D as viewed in Fig. 3, under the influence of lever 38, the latter lever being securely fixed to the aforesaid pin 67 by a tapered pin 67ᵃ so that movement of lever 38 will effect a corresponding movement of valve D. The valve D is, however, free to move clockwise as viewed in Fig. 3 away from the stop 69 under the influence of governor E as will be presently apparent.

It will also be noted that the flange or stop 69 provides the operating medium between selector arm 57 and distributor valve D whereby the valve D may be positively moved in a clockwise direction through the medium of the lever 38.

In Fig. 1 it will be noted that the selector arm 57 is illustrated as being aligned with the first speed notch 59, and in Fig. 3 the valve D is shown for its position corresponding to this setting wherein the outlet 46 is in communication with the conduit 47. Likewise when the selector arm 57 is adjusted, under certain conditions hereinafter more apparent, to the second speed stop 60, the valve D is moved from the position illustrated in Fig. 3 to a position establishing communication between outlet 46 and the second speed conduit 48. In similar fashion the conduit 49 is the third speed or direct conduit, conduit 50 being the reverse conduit, these conduits being respectively supplied with oil under pressure by communication with the outlet 46 when the selector arm 57 is adjusted to the notches 61 or 62 provided, however, that the motor vehicle speed responsive controlling means will accommodate the mechanism to such adjustment. Under similar conditions the outlet 46 is adjusted to the neutral space 61 when the selector arm 57 is adjusted to the neutral notch 63.

I will next describe the motor vehicle speed responsive controlling means and also the throttle valve or accelerator pedal regulatable control thereof, reference being had particularly to Figs. 4, 5, and 6. The power take-off shaft 10 of the transmission is provided with a gear 70 adapted to drive a cross shaft 71 through a gear 72 carried thereby and meshing with the gear 70, the shaft 71 being rotatably supported in spaced bearings 73 and 74. The shaft 71 projects through the casing 75 of transmission C and drives the governor E which is provided with the usual cup 76 splined at 77 to the shaft 71. A plurality centrifugally actuated gocernor balls 78 operate within cup 76 and against the reaction backplate 79 so that, as the speed of shaft 10 increases, the governor E will be driven through shaft 71 proportionately, the governor balls 78 being thrown outwardly under the action of centrifugal forces to move the cup 76 longitudinally outwardly of the shaft 71. This movement of cup 76 acts on a lever 80 pivotally supported at 81 to a fixed bracket 82, the lever having a second lever arm 83 carrying a cam 84 on its outer end.

The cam 84 has a series of spaced notches 85, 86, and 87, these notches being respectively designated as the first speed notch, second speed notch, and the third or direct speed notch. It will be noted that these notches are progressively outwardly spaced from pivot 81 and further that the cam 84 has an inner extension formed adjacent notch 85 with a cam surface 88 concentric with the pivot 81 to provide spaced portions thereof which, for the present, will be designated at 89 and 90. The portion 89 may be termed the neutral portion of cam face 88 and the portion 90 thereof may be termed the reverse portion. For convenience in reference of Figs. 4 and 5 I have illustrated a plurality of lines radially formed from pivot 81 and designated 1, 2, 3, N and R, these symbols respectively meaning first, second, third, neutral and reverse, and they furthermore respectively correspond to the notches and cam portions 85, 86, 87, 89 and 90.

The levers 80 and 83 have associated therewith a further lever 91 extending outwardly from the pivot 81, it being understood that these three levers are movable as a unit about the pivot 81. The lever 91 is pivotally connected at 92 with the link 40, a spring 93 shown in Fig. 3 acting on the link 40 in opposition to movement of link 40 induced by the governor E. The inner surface of governor cup 76 may be suitably shaped so as to actuate cam 84 and distributor valve D at the desired speeds of motor vehicle travel, within the conditions imposed by the mechanism, it being noted that in Fig. 4 the governor balls 78 are illustrated in their position of actuation corresponding to first speed.

Engageable with cam 84 is a roller 94 herein illustrated as a cylindrical roller carried by spaced links 95 and 96, best shown in Fig. 6, these links being provided with a pivot pin 97 at the other end of the links. The pin 97 is guided for arcuate movement by reason of a supporting arm 98 one end of which carries the pin 97 and the other end thereof being formed with a laterally extending bearing portion 99 journaled in an opening 100 formed in a bracket 101 fixed to or forming a part of the transmission casing 75. Pivotally connected to pin 97 and journaled thereon intermediate the links 95 and 96 is a further link 102.

The link 102 has its opposite end pivotally connected by a pin 103 to one end of a rod 104, this rod extending forwardly for pivotal connection at 105 with a bell crank lever 106, the latter being pivotally supported at 107. This bell crank lever is adapted for actuation by a suitable manually operated means and preferably the manual means ordinarily used on a motor vehicle for adjusting the engine throttle valve.

Thus, in Fig. 1 the usual motor vehicle toeboard is illustrated at 108 together with the usual accelerator pedal 109 pivotally supported at 110 on the toeboard. The pedal is connected at 111 with a rod 112 which is connected at 113 to the aforesaid bell crank lever 106. A further linkage designated at 114 extends forwardly from the pivot 105 for actuating the usual engine throttle valve (not shown) in the customary and well-known manner.

Acting on the roller 94 and tending to urge this roller yieldingly toward cam 84 is a plunger 115 illustrated in Figs. 4 and 5, the plunger being urged outwardly by a spring 116. It will thus be apparent that the effective rate of spring 116 acting on roller 94 is changed as the accelerator pedal 109 is operated. Thus, the resistance point of cam links 95, and 96 on cam 84 is determined by the position of the pivot pin 97 so that as pin 97 swings about the pivot 99 as the accelerator pedal is depressed the resistance to movement of cam 84 in a clockwise direction as viewed in Fig. 4 is increased. It will furthermore be noted that as the accelerator pedal is depressed, the resulting additional loading on cam 84 from spring 116 is not transmitted to the accelerator pedal 109, this pedal being entirely free from the load control on the governor actuated cam 84.

The notches 85, 86 and 87 of cam 84 serve to hold the cam against fluctuating action under the influence of governor E and, provided that the accelerator pedal 109 is positioned so as to permit cam movement, the cam 84 will quickly move from one notch to another when the governor builds up sufficient force acting on the cam to overcome the resistance encountered primarily by the roller 94 and also by spring 83

In the operation of my power transmission mechanism, let it be presumed that the parts are positioned for operating the transmission in the first speed as illustrated in Figs. 1 to 4, inclusive. With the parts in this position the distributor valve D has its fluid distributing outlet 46 aligned with the first speed conduit 47 so as to supply fluid under pressure to the first speed brake controlling device 14 illustrated in Fig. 7. In Fig. 7 the braking device is shown in its operative position for first speed drive through transmission C whereby the drum or rotary element 18 is held against rotation so as to drive shaft 10 through the planetary gearing 19. It will be understood, however, that when the fluid is released, the pistons 27 and 28 are urged toward each other by spring 24 so as to expand the brake band 21 and release the drum 18.

If the first speed drive was reached from a neutral condition of transmission C, this first speed drive is obtained by manual movement of selector arm 57 from the neutral notch 63 of selector segment 64 to engagement with the first speed notch 59. During such movement the actuating stop 69 in Fig. 3 will engage the lever 38 so as to swing the distributor valve D to position the fluid outlet 46 from the neutral space 51 to the position illustrated in Fig. 3 in the alignment with the first speed conduit 47. This manual movement initially from a condition of neutral is necessary since in the neutral position the power take-off shaft 10 is stationary and governor E is inactive. However, when the distributor valve D is adjusted to the first speed position, the fluid pressure from pump 34 is introduced to actuate the first speed brake controlling device 14 and the motor vehicle may then be accelerated in low speed.

In the event that the motor vehicle operator desires to accelerate the motor vehicle in low gear to a speed beyond that where governor E would actuate cam 84 to position the second speed notch 86 against roller 94, he is enabled to carry this acceleration to a higher degree by maintaining accelerator pedal 109 in a depressed condition whereby the pivot pin 97 is swung downwardly about the pivot 99 so as to increase the effective rate of spring 116 acting against roller 94. Thus, where the accelerator pedal 109 is maintained in such depressed condition, the governor E will not develop sufficient force under the action of the centrifugally actuated balls 78 to swing the cam 84, although, if desired, the various parts may be readily proportioned to permit governor E to actuate cam 84 as the engine approaches its maximum speed in low gear with the accelerator pedal 109 fully depressed. In any event, the accelerator pedal 109, when depressed, will cause a dwell in the action of cam 84 beyond the speed of driven shaft 10 where the governor E would normally develop sufficient force to swing the cam 84 to its position illustrated in Fig. 5.

As the motor vehicle is being accelerated in first speed, the governor balls 78 will, at the desired point, develop sufficient force to overcome the resistance of spring 93 together with the resistance experienced by reason of roller 94 engaging the first speed cam notch 85 and when the vehicle operator momentarily releases or partially releases the accelerator pedal 109 the governor E may then quickly act on cam 84 so as to swing this cam clockwise as viewed in Fig. 4 to position the second speed notch 86 in engagement with the roller 94. When this cam movement takes place, the governor actuated link 40 moves against the action of spring 93 and by reason of lever 38 the distributor valve D is rotated clockwise as viewed in Fig. 3 so as to move the fluid outlet 46 from the position illustrated in Fig. 3 to a position where the outlet 46 is aligned with the second speed conduit 48.

As the fluid conduit 46 is moved away from communication with the first speed conduit 47, the fluid pressure in conduit 47 is relieved and spring 24 associated with the first speed brake controlling device 14 will act to expand the first speed brake band 21 so as to release the first speed drum 18. Thus, the drive in first speed is released, the first speed pistons 27 and 28 moving toward each other so as to displace a certain amount of the fluid through conduit 47 toward valve D. This displaced fluid enters the low pressure chamber 42 and returns to reservoir 33 by reason of the return conduit 52. Meantime, the fluid pressure is admitted to the second speed conduit 48 so as to actuate the second speed braking device 16 in a manner similar to that described in connection with the energization of the first speed braking device 14. The motor vehicle is then driven in the second speed.

In the foregoing illustration it is presumed that the operator has manipulated the selector arm 57 from the neutral notch 63 to the first speed notch 59 and has then accelerated the motor vehicle in low gear followed by an acceleration in second speed independent of further adjustment of the selector arm 57. The acceleration in second speed is controlled by the accelerator pedal 109 in a manner similar to that explained in connection with the acceleration in first speed. Thus, the motor vehicle operator may maintain the accelerator pedal 109 depressed for an abnormal acceleration of the motor vehicle in order to cause a dwell to take place before the governor E actuates cam 84 to position the third speed notch 87 opposite or in engagement with the roller 94. On the other hand the vehicle operator may accelerate the motor vehicle in second speed to a lesser or normal degree and, when the accelerator pedal 109 is momentarily released, the force developed by governor E will quickly move cam 84 to engage the third speed notch 87 with roller 94. Such movement causes actuation of the third speed device 17 and releases the second speed braking device 16 in a manner similar to that previously described in connection with the change from first speed to second speed.

With the selector arm 57 still maintained in engagement with the first speed notch 59, it will be apparent that the motor vehicle may be accelerated successively in the first, second, and then the third or direct speed. It will be understood that in the event that a rapid acceleration of the motor vehicle is desired in one of the lower speeds, the vehicle operator may maintain the accelerator pedal 109 in a depressed condition so as to rapidly accelerate the car in one of the lower speeds until the car has gained sufficient momentum to energize governor E to the point where the cam 84 tends to be swung to its direct driving position. Under such conditions when the accelerator pedal 109 is released, the governor E will quickly act and where the motor vehicle was accelerated in the first speed the governor E will move cam 84 directly from the first speed to the third speed with sufficient rapidity so that the second speed braking device will not be energized on release of the first speed braking device. It will thus be apparent that the changes in the transmission speeds are under control of the operator and are also automatic by reason of the action of governor E.

Assuming that the motor vehicle is being driven in the third or direct speed so that cam notch 87 is in engagement with the roller 94 and the fluid outlet 46 is aligned with the third speed fluid conduit 49, then when the motor car is slowed down as would normally be experienced when reaching a steep hill or where the vehicle operator closes the throttle valve of the engine by releasing the accelerator pedal 109, the resulting retardation of the motor vehicle will relieve the force exerted by governor E on cam 84 and at the proper predetermined desired speed the spring 93 will overcome the force of the governor and the cam 84 will be moved counterclockwise as viewed in Fig. 4 so as to position the cam notch 86 in engagement with the roller 94. Thus, the transmission will be manipulated into the second speed and likewise upon further retardation of the motor vehicle the cam notch 85 will be engaged with roller 94 so as to manipulate the transmission into the first speed setting. During the foregoing description of the operation it has been presumed that the selector arm 57 has been left in engagement with the first speed notch 59. Under such conditions, it will be apparent that the governor E may automatically manipulate the transmission into speeds higher than the setting of the selector arm and also from such higher speeds downwardly as far as the setting of the selector arm will permit. Such action is determined by engagement of the lever 38 with the stop 69, the lever 38 being free to rotate the valve D clockwise away from stop 69 as viewed in Fig. 3 although counterclockwise movement thereof is limited by this stop.

On retardation of the motor vehicle to the first speed setting where the selector arm 57 is in engagement with the first speed notch 59, the motor vehicle may be brought to rest with the first speed setting maintained by reason of the slippage provided in the fluid clutch. Where a clutch of the fluid type is not used it will be apparent that the main engine clutch between the engine and transmission may be released either manually or automatically as desired so that the engine A may be idled with the motor vehicle brought to rest. After the motor vehicle is brought to rest by the application of the usual wheel brake mechanism (not shown) further acceleration of the motor vehicle may be produced by depressing the accelerator pedal 109, the fluid clutch B being thereby energized sufficiently to transmit the power to the transmission for driving in the first speed. Further acceleration of the motor vehicle is obtained in a manner similar to that previously described.

Let it be presumed that the selector arm 57 is engaged with the neutral notch 63 so that the transmission C is not actuated, and let it be presumed that motor vehicle acceleration is desired from the neutral condition in some forward speed other than the first speed. The operator thereupon moves the selector arm 57 into engagement with either the second speed notch 60 or the third speed notch 61 whereupon the accelerator pedal 109 is depressed and the motor vehicle may be accelerated in the setting determined by the position of the selector arm. For example, the operator may manipulate the selector arm 57 into engagement with the second speed notch 60 and motor vehicle acceleration will thereupon take place in the second speed. When the acceleration reaches a predetermined point sufficient to energize governor E, the governor will cause the cam 84 to swing and thereby move valve D into the third speed position. When the motor vehicle is retarded, the valve D under the action of the governor will automatically return the valve to the second speed setting but unless the operator moves the selector arm 57 into engagement with another of the segment notches the governor E is prevented from adjusting the valve D in the counterclockwise direction as viewed in Fig. 3 below the setting for the second speed which is thereby maintained.

It is furthermore apparent that the selector arm 57 may be at any time adjusted to a speed ratio higher than that obtained under the influence of governor E. Thus, for example, let it be presumed that the motor vehicle is being driven under the influence of governor E in the second speed position whereby fluid outlet 46 is aligned with the second speed conduit 48. Let it now be presumed that the motor vehicle driver desires to manipulate the transmission into the third speed setting in advance of the motor vehicle speed which would normally cause governor E to actuate the valve D into the third speed setting. In order to obtain such action, the vehicle operator moves the selector arm 57 into engagement with notch 61, the stop 69 swinging lever 38 against the action of spring 93 and the cam 84 is moved so that the cam and distributor valve are simultaneously adjusted for their third speed settings. If the selector arm 57 is left in the third speed setting, it is apparent that the governor E upon motor vehicle retardation will not manipulate the transmission into lower speed ratio settings and the third speed setting will be maintained.

When it is desired to operate the motor vehicle in reverse, the operator actuates the selector arm 57 into engagement with the reverse notch 62 whereupon the spring 93 will move cam 84 in a counterclockwise direction as viewed in Fig. 4 so that the reverse portion 90 of the cam face 88 is engaged by roller 94. The spring 93 thus causes lever 38 and valve D to position the fluid outlet 46 into alignment with the reverse conduit 50 and the reverse brake actuating device 15 is thereby energized so that the power take-off shaft 10 is driven in the reverse direction. The governor cup 76 is so designed that when the cam 84 is swung in a counterclockwise direction as viewed in Fig. 4, the necessary clearance for movement of the governor cup is afforded for the governor balls 78 as will be readily understood. Thus, in Fig. 4 the governor balls 78 are illustrated for their positions of adjusting cup 76 for engaging the cam notch 85 with roller 94. If the motor vehicle is brought to rest, the governor balls 78 will move inwardly toward shaft 71 and the cam 84 may be moved counterclockwise into either the neutral setting or the reverse setting under the influence of spring 93.

In Fig. 5 I have illustrated the position of the parts associated with the governor E when the cam 84 is adjusted with its second speed notch 86 in engagement with the roller 94. In Fig. 5 the accelerator pedal has been depressed so as to swing the pivot 97 downwardly to increase the effective rate of spring 116 so as to resist clockwise movement of cam 84 under the influence of governor balls 78. It will be apparent that under such conditions the cam 84 may be caused to quickly rotate clockwise to engage the third speed notch 87 with the roller 94 when the accelerator pedal 109 is momentarily released so as to move the pin 97 to position the linkage associated therewith in accordance with the dotted line positions illustrated in Fig. 5. Under such conditions the roller 94 does not offer as much resistance to movement of the cam beyond the second speed notch 86 and the governor E will thereupon respond to such adjustment provided of course that the speed of the motor vehicle is maintained sufficient to tend to move the cam 84 into the third speed setting.

The term "speed ratio" or similar expression is used in my specification and claims in a broad sense to include a direct or 1 to 1 speed ratio drive.

Various modifications and changes will be readily apparent from the teachings of my invention, as set forth in the appended claims, and it is not my intention to limit my invention to the particular details of construction and operation shown and described for illustrative purposes.

What I claim is:

1. In a motor vehicle power transmission having a plurality of speed ratio controlling devices providing a plurality of forward speeds, neutral and reverse, power operated means for actuating said controlling devices, means controlling said power operated means for effecting selective actuation of said controlling devices, means responsive to motor vehicle speed for operating said selective controlling means, a manually contacted adjustable selector element, and manually actuated means actuated in response to manual adjustment of said selector element for operating said speed responsive means to selectively provide a plurality of forward driving speed ratios and reverse to thereby operate said selective controlling means.

2. In a motor vehicle power transmission having a plurality of speed ratio controlling devices providing a plurality of forward speeds, neutral and reverse, power operated means for actuating said controlling devices, means controlling said power operated means for effecting selective actuation of said controlling devices, means responsive to motor vehicle speed for operating said selective controlling means, a manually contacted adjustable selector element, and manually actuated means actuated in response to manual adjustment of said selector element for operating said selective controlling means to selectively provide a plurality of forward driving speed ratios and reverse independently of the operation of said speed responsive means but only for effecting one or more forward driving speed ratios providing motor vehicle drive faster than the speed ratio tending to be effected under the operation of said speed responsive means.

3. In a motor vehicle power transmission having a plurality of speed ratio controlling devices providing a plurality of forward speeds, neutral and reverse, power operated means for actuating said controlling devices, means controlling said power operated means for effecting selective actuation of said controlling devices, said selective controlling means having a plurality of directions of progressive selective operation for respectively increasing and decreasing the speed ratio setting of the transmission, means responsive to motor vehicle speed for operating said selective controlling means to selectively provide increasing and decreasing forward speed ratio drives, a manually adjustable selector element, manually actuated means actuated in response to manual adjustment of said selector element for positively operating said selective controlling means independently of said operation thereof by said speed responsive means and in one of said directions of progressive selective operation to effect selective changes in the transmission setting from reverse to neutral or to any one of said plurality of forward speeds, and means yieldingly operating said selective controlling means in response to operation of said manually actuated means and in another of said directions, said yielding means opposing operation of said speed responsive means.

4. In an engine driven vehicle having a planetary gear transmission provided with a plurality of speed ratio braking devices, means responsive to predetermined increments of vehicle speed variation for selectively operating said braking devices, said speed responsive means including a stepped cam, a cam follower, and yielding means urging said follower successively into engagement with the cam steps, and manually operated means for varying the resistance to movement of said cam under the influence of said yielding means.

5. In an engine driven vehicle having a planetary gear transmission provided with a plurality of speed ratio braking devices, means responsive to predetermined increments of vehicle speed variation for selectively operating said braking devices, said speed responsive means including a stepped cam, a cam follower, and yielding means urging said follower successively into engagement with the cam steps, and means responsive to engine throttle valve adjustment for varying the resistance to movement of said cam under the influence of said yielding means.

6. In an engine driven vehicle transmission having a plurality of speed ratio controlling devices, power operating means including an adjustable speed ratio selector for selectively operating said devices, vehicle speed responsive means including a stepped movable member adapted to adjust said selector, a follower, yielding means urging said follower successively into engagement with the steps of said member, and means responsive to engine throttle valve adjustment for varying the resistance to movement of said stepped member under the influence of said yielding means.

7. In an engine driven vehicle having a transmission provided with a plurality of speed ratio controlling devices, means responsive to predetermined increments of vehicle speed variation for selectively operating said devices, said speed responsive means including a movable member, yielding means acting on said member to resist movement thereof and to thereby delay selective operation of said devices by said speed responsive means, and engine throttle valve adjusting means including a manually operated control element adapted to vary the effective force of said yielding means on said movable member without loading said manually operated control element.

8. In a motor vehicle planetary gear transmission having a plurality of fluid pressure operated speed ratio braking devices, a fluid reservoir, a pump, means including an adjustable distributer valve for selectively applying fluid under pressure from said reservoir and pump to actuate said braking devices and for returning the fluid from said braking devices to said reservoir, means acting on said distributer valve and adapted for selective movement to a plurality of positions of transmission forward, reverse, and neutral conditions of control whereby to effect corresponding adjustment of said distributer valve, manually controlled means for selectively moving said distributer valve adjusting means to said positions of control and including a plurality of positions of forward speed ratio drives for the vehicle, vehicle speed responsive means for selectively moving said distributer valve adjusting means under control of said manually controlled means to effect an increase and decrease in the driving speed ratio of the transmission in response to acceleration and retardation of the motor vehicle, said distributer valve actuating means including an element operably connected to said speed responsive means and to said manually controlled means, and yielding means acting on said element tending to adjust said distributer valve to a position of reverse drive through the transmission.

9. In a motor vehicle transmission having a plurality of speed ratio controlling devices providing a plurality of forward drives, neutral and reverse, power operated selector means for selectively operating said devices, vehicle speed responsive means operably connected to said power operated means and including an actuating member having a plurality of separate positions of movement for control of said power means and respectively corresponding to said forward drives, neutral and reverse, a manually adjustable selector element having a plurality of separate positions of adjustment respectively corresponding to said forward drives, reverse and neutral, lost motion means operably connecting said selector element to said actuating member and adapted to positively move said actuating member selectively from one of its said positions of neutral and reverse to one of its said forward drive positions of movement, and yielding means acting on said actuating member when moved to one of its said forward drive positions for urging movement of said actuating member toward one of its said neutral and reverse positions.

10. In a motor vehicle transmission having a plurality of speed ratio controlling devices providing a plurality of forward drives, reverse and neutral, power operated selector means for selectively operating said devices, vehicle speed responsive means operably connected to said power operated means and including an actuating member having a plurality of separate positions of movement for control of said power means and respectively corresponding to said forward drives, reverse and neutral, a manually adjustable selector element having a plurality of separate positions of adjustment respectively corresponding to said forward drives, reverse and neutral, lost motion means operably connecting said selector element to said actuating member and adapted to positively move said actuating member selectively from one of its said positions of neutral and reverse to one of its said forward drive positions, and means yieldingly acting on said actuating member to yieldingly resist movement thereof from one of its forward drive controlling positions toward a position of faster forward drive control and from its positions of neutral and reverse drive control toward one of its forward drive controlling positions.

11. In a motor vehicle transmission having a plurality of speed ratio controlling devices providing a plurality of forward drives, neutral and reverse, power operated selector means for selectively operating said devices, vehicle speed responsive means operably connected to said power operated means and including an actuating member having a plurality of separate positions of movement for control of said power means and respectively corresponding to said forward drives, neutral and reverse, a manually adjustable selector element, means for mounting said selector for manually adjustable movement selectively in opposite directions to separate positions of progressive adjustment for control of said power means and respectively corresponding to said forward drives, neutral and reverse, lost motion means operably connecting said selector element to said actuating member and adapted in response to movement of said selector element in one of its said directions of movement to positively selectively move said actuating member to its said positions of control for said forward drives and neutral, and means yieldingly acting on said actuating member in opposition to said positive movement thereof for urging said actuating member toward its said position of reverse control.

12. In a motor vehicle transmission having a plurality of speed ratio controlling devices providing a plurality of forward drives, neutral and reverse, power operated selector means for selectively operating said devices, vehicle speed responsive means operably connected to said power operated means and including an actuating member having a plurality of separate positions of movement for control of said power means and respectively corresponding to said forward drives, neutral and reverse, a manually adjustable selector element, means for mounting said selector for manually adjustable movement selectively in opposite directions to separate positions of progressive adjustment for control of said power means and respectively corresponding to said forward drives, neutral and reverse, lost motion means operably connecting said selector element to said actuating member and adapted in response to movement of said selector element in one of its said directions of movement to positively selectively move said actuating member to its said positions of control for said forward drives, and means yieldingly acting on said actuating member for urging said actuating member in a direction of movement opposite to said positive movement.

13. In a motor vehicle transmission having a plurality of speed ratio controlling devices providing a plurality of forward drives, neutral and reverse, power operated selector means for selectively operating said devices, vehicle speed responsive means operably connected to said power operated means and including an actuating member having a plurality of separate positions of movement for control of said power means and respectively corresponding to said forward drives, neutral and reverse, a manually adjustable selector element, means for mounting said selector for manually adjustable movement selectively in opposite directions to separate positions of progressive adjustment for control of said power means and respectively corresponding to said forward drives, neutral and reverse, means operably connecting said selector element to said actuating member to positively selectively move said actuating member in one of its said directions of movement, and means yieldingly acting on said actuating member in opposition to said positive moving means.

14. In a motor vehicle transmission having a plurality of speed ratio controlling devices providing a plurality of forward drives, neutral and reverse, power operated selector means for selectively operating said devices, vehicle speed responsive means operably connected to said power operated means and including an actuating member having a plurality of separate positions of movement for control of said power means and respectively corresponding to said forward drives, neutral and reverse, a manually adjustable selector element, means for mounting said selector for manually adjustable movement selectively in opposite directions to separate positions of progressive adjustment for control of said power means and respectively corresponding to said forward drives, neutral and reverse, means operably connecting said selector element to said actuating member to positively selectively move said actuating member in one of its said directions of movement, and means yieldingly acting on said actuating member in opposition to said positive moving means, said yielding means including a spring adapted to yieldingly move said actuating member relatively between its said positions of control for reverse and neutral.

15. In a motor vehicle transmission having a plurality of speed ratio controlling devices providing a plurality of forward drives, neutral and reverse, power operated selector means for selectively operating said devices, vehicle speed responsive means operably connected to said power operated means and including an actuating member having a plurality of separate positions of movement for control of said power means and respectively corresponding to said forward drives, neutral and reverse, a manually adjustable selector element, means for mounting said selector for manually adjustable movement selectively in opposite directions to separate positions of progressive adjustment for control of said power means and respectively corresponding to said forward drives, neutral and reverse, means operably connecting said selector element to said actuating member to positively selectively move said actuating member in one of its said directions of movement, and means yieldingly acting on said actuating member in opposition to said positive moving means, said yielding means including a spring adapted to yieldingly move said actuating member relatively between its said positions of control for reverse and one of said forward drives.

16. In a motor vehicle power transmission having a plurality of speed ratio controlling devices, power operated means for actuating said controlling devices, means controlling said power operated means for effecting selective actuation of said controlling devices, means responsive to motor vehicle speed for operating said selective controlling means whereby to increase and decrease the driving speed ratio of the transmission in response to acceleration and retardation of the motor vehicle, a manually contacted selector element adjustable to a plurality of stations of transmission settings corresponding to low, high and reverse speeds, and mechanism operably connecting said selector element and said speed responsive operating means to effect driving of the vehicle in low, high and reverse speeds, said mechanism including a stop movable in response to manual adjustment of said selector element for operating said selective controlling means and for limiting operation of said speed responsive means on deceleration of said motor vehicle.

17. In a motor vehicle planetary gear transmission having a plurality of speed ratio controlling braking devices, fluid power operated means for actuating said braking devices, means controlling said fluid power operated means for effecting selective actuation of said braking devices, means responsive to motor vehicle speed for operating said selective controlling means whereby to increase and decrease the driving speed ratio of the transmission in response to acceleration and retardation of the motor vehicle, a manually contacted selector element adjustable to a plurality of stations of transmission settings corresponding to reverse, neutral, and a plurality of forward driving speeds, and mechanism operably connecting said selector element and said speed responsive operating means for positively operating said selective controlling means from a reverse drive setting of the transmission to selectively provide a neutral setting or a plurality of forward driving speed ratios independently of the operation of said speed responsive means, said speed responsive operating means and said mechanism being so constructed and arranged when the transmission is set to drive the vehicle forwardly in its lowest speed ratio as to limit said positive operation of said selective controlling means to effect only one or more increasing driving speed ratios of the transmission.

18. In a motor vehicle power transmission having a plurality of speed ratio controlling devices for forward and reverse drives, power operated means for actuating said controlling devices, means controlling said power operated means for effecting selective actuation of said controlling devices, means responsive to motor vehicle speed for operating said selective controlling means whereby to increase and decrease the driving speed ratio of the transmission in response to acceleration and retardation of the motor vehicle, yielding means acting throughout the selective operation of said selective controlling means to urge said speed responsive means in a position for effecting a reverse drive through the transmission, a manually adjustable selector element having positions of transmission control for neutral, reverse, and a plurality of forward driving speeds, and means operably connecting said selector element with said speed responsive means for selectively actuating said selective controlling means, said connecting means acting in opposition to said yielding means only when said selector element is adjusted to a position of one of said forward driving speeds from a position of neutral, reverse or a forward driving speed of lower speed ratio.

19. In a motor vehicle planetary gear transmission having a plurality of speed ratio braking devices providing a plurality of forward speeds, reverse and neutral, power means for actuating said braking devices, vehicle speed responsive means controlling said power means to progressively actuate said forward speed ratio braking devices, and manually actuated means acting on said speed responsive means to control said power means independently of said control thereof in response to vehicle speed, said manually actuated means including a manually adjustable selector element having a plurality of separate stations of selective adjustment for respectively providing said forward and reverse speeds and neutral, said manually actuated means further including a member operably connected to said selector element for limiting operation of said speed responsive means on deceleration of said motor vehicle in its forward drive.

20. In a motor vehicle planetary gear transmission having a plurality of speed ratio fluid pressure operated braking devices providing a plurality of forward speeds, reverse and neutral, distributor valve means for selectively supplying fluid pressure to actuate said braking devices, governor controlled means for operating said distributer valve means in response to vehicle speed, and manually actuated means acting on said governor controlled means for operating said distributer valve means, said manually actuated means including a manually adjustable selector element having a plurality of separate stations of selective adjustment for respectively providing said forward and reverse speeds and neutral, said manually actuated means further including a member operably connected to said selector element for limiting operation of said speed responsive means on deceleration of said motor vehicle.

21. In an engine driven vehicle including a planetary gear transmission having a plurality of speed ratio braking devices providing a plurality of forward speeds, reverse and neutral, means responsive to predetermined increments of vehicle speed variation for selectively operating said forward speed ratio braking devices, and manually actuated means for varying said increments of vehicle speed response, said manually actuated means including a manually adjustable selector element having a plurality of separate stations of selective adjustment for respectively providing said forward and reverse speeds and neutral, said manually actuated means further including a member operably connected to said selector element for limiting operation of said speed responsive means on deceleration of the motor vehicle in its forward drive.

22. In a motor vehicle planetary gear transmission having a plurality of speed ratio fluid pressure operated controlling braking devices, means including a distributor valve for supplying fluid under pressure to said braking devices whereby said braking devices are selectively operated under power by said fluid pressure, vehicle speed responsive means for moving said distributor valve in opposite directions respectively in response to acceleration and retardation of the vehicle, manually operable means for moving said distributor valve in at least one of its said directions whereby said braking devices are selectively operated under power by said fluid pressure, said speed responsive means including an element connected to said distributer valve for effecting said opposite directional movement thereof, said manually operable means including an operating member engageable with said element whereby to move said distributor valve through the intermediary of said element, and means for mounting said element, member, and distributor valve for oscillation about a common axis.

23. In a motor vehicle planetary gear transmission having a plurality of speed ratio fluid pressure operated braking devices providing a plurality of forward speeds, reverse and neutral, distributor valve means for selectively supplying fluid pressure to actuate said braking devices, governor controlled means for operating said distributor valve means selectively in opposite directions of movement respectively in response to increasing and decreasing vehicle speeds, and manually actuated means for operating said distributor valve means independently of the vehicle speed and in only one of said directions of movement, said manually actuated means including a manually adjustable selector element having a plurality of separate stations of selective adjustment for respectively providing said forward and reverse speeds and neutral, said manually actuated means further including a member operably connected to said selector element for limiting operation of said governor controlled means in the other of said directions.

24. In an engine driven vehicle including a planetary gear transmission having a plurality of speed ratio braking devices providing a plurality of forward speeds, reverse and neutral, means responsive to predetermined increments of vehicle speed variation for selectively operating said forward speed ratio braking devices, and manually actuated means for selectively operating said braking devices to effect a plurality of forward driving speed ratios independently of said operation thereof by said speed responsive means, said manually actuated means including a manually adjustable selector element having a plurality of separate stations of selective adjustment for respectively providing said forward and reverse speeds and neutral.

25. In a motor vehicle power transmission having a plurality of speed ratio controlling devices providing a plurality of forward speeds, reverse and neutral, a plurality of fluid pressure operated means for respectively actuating said controlling devices, distributor valve means adjustable to a plurality of positions for selectively supplying fluid pressure to said fluid pressure operated means whereby to provide forward and rearward speed ratio drives for the motor vehicle, governor means actuated in response to the speed of the vehicle, control means operated by the governor, means actuated by said governor control means for adjusting said distributor valve means, and yielding means acting on said governor control means throughout the selective adjustment of said distributor valve means and tending to adjust said distributor valve means in one of its said positions of adjustment for establishing a drive for the motor vehicle.

26. In a motor vehicle power transmission having a plurality of speed ratio controlling devices providing a plurality of forward speeds, reverse and neutral, a plurality of fluid pressure operated means for respectively actuating said controlling devices, distributor valve means adjustable to a plurality of positions for selectively supplying fluid pressure to said fluid pressure operated means, governor means actuated in response to the speed of the vehicle, control means operated by the governor, means actuated by said governor control means for adjusting said distributor valve means, and manually operable means including a member having a lost motion connection to said governor control means whereby to positively adjust said distributor valve against the adjusting influence exerted on the distributor valve by said governor, said manually operable means further including a manually adjustable selector lever operably connected to said member and having a plurality of separate stations of selective adjustment corresponding respectively to said forward speeds, reverse and neutral.

27. In a motor vehicle planetary gear transmission having a plurality of fluid pressure operated speed ratio braking devices, a fluid reservoir, a pump, means including an adjustable distributor valve for selectively supplying fluid under pressure from said reservoir and pump to actuate said braking devices and for returning the fluid from said braking devices to said reservoir, means acting on said distributor valve and adapted for selective movement to a plurality of positions of transmission forward, reverse, and neutral conditions of control whereby to effect corresponding adjustment of said distributor valve, a manually operable selectively adjustable control element having a plurality of separate stations of controlling adjustment, manually controlled operating means operated in response to selective adjustment of said manually operable control element for selectively moving said distributor valve adjusting means to said positions of control and including a plurality of positions of forward speed ratio drives, reverse and neutral, and vehicle speed responsive means for selectively moving said distributor valve adjusting means under control of said manually controlled operating means to effect an increase and decrease in the driving speed ratio of the transmission in response to acceleration and retardation of the motor vehicle.

HARRY T. WOOLSON.